(12) United States Patent
Yu

(10) Patent No.: US 10,116,185 B2
(45) Date of Patent: Oct. 30, 2018

(54) MOTOR

(71) Applicant: LG Innotek Co., Ltd., Seoul (KR)

(72) Inventor: Hyun Soo Yu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 176 days.

(21) Appl. No.: 15/027,119

(22) PCT Filed: Sep. 23, 2014

(86) PCT No.: PCT/KR2014/008858
§ 371 (c)(1),
(2) Date: Apr. 4, 2016

(87) PCT Pub. No.: WO2015/050335
PCT Pub. Date: Apr. 9, 2015

(65) Prior Publication Data
US 2016/0248297 A1    Aug. 25, 2016

(30) Foreign Application Priority Data

Oct. 4, 2013    (KR) .................. 10-2013-0118491

(51) Int. Cl.
| | |
|---|---|
| *H02K 11/33* | (2016.01) |
| *H02K 5/18* | (2006.01) |
| *H02K 9/06* | (2006.01) |
| *H02K 9/22* | (2006.01) |
| *H02K 5/02* | (2006.01) |
| *H02K 1/27* | (2006.01) |

(52) U.S. Cl.
CPC .................. *H02K 5/18* (2013.01); *H02K 5/02* (2013.01); *H02K 9/06* (2013.01); *H02K 9/22* (2013.01); *H02K 11/33* (2016.01); *H02K 1/278* (2013.01)

(58) Field of Classification Search
CPC ................................. H02K 5/18; H02K 11/33
USPC ........................................................ 310/60 R
See application file for complete search history.

(56) References Cited

U.S. PATENT DOCUMENTS

| | | | |
|---|---|---|---|
| 6,396,190 B1 | 5/2002 | Ahn et al. | |
| 2003/0107278 A1 | 6/2003 | Agnes et al. | |
| 2010/0320878 A1* | 12/2010 | Izumi | H02K 5/20 |
| | | | 310/60 R |

(Continued)

FOREIGN PATENT DOCUMENTS

| | | |
|---|---|---|
| CN | 101931284 A | 12/2010 |
| EP | 2797209 A1 | 10/2014 |

(Continued)

OTHER PUBLICATIONS

Extended European Search Report dated Aug. 29, 2016 in European Application No. 14850912.8.

(Continued)

*Primary Examiner* — Terrance Kenerly
(74) *Attorney, Agent, or Firm* — Saliwanchik, Lloyd & Eisenschenk

(57) ABSTRACT

A motor according to one embodiment of the present invention comprises: a rotation shaft; a rotor part encompassing the rotation shaft; a stator part arranged to be spaced from the rotor part; and a housing for fixing the stator part, wherein the inner surface of the housing includes a plurality of projection units.

8 Claims, 4 Drawing Sheets

(56) References Cited

U.S. PATENT DOCUMENTS

| | | | | |
|---|---|---|---|---|
| 2011/0168356 A1* | 7/2011 | Knight | ............... | H02K 5/20 |
| | | | | 165/104.19 |
| 2011/0254393 A1* | 10/2011 | Yamasaki | ............ | H02K 5/18 |
| | | | | 310/64 |
| 2011/0266898 A1* | 11/2011 | Vadillo | ............... | H02K 9/14 |
| | | | | 310/62 |
| 2012/0169162 A1* | 7/2012 | Tang | ................ | H02K 5/18 |
| | | | | 310/64 |

FOREIGN PATENT DOCUMENTS

| | | |
|---|---|---|
| FR | 2768272 A1 | 3/1999 |
| JP | 05-002561 U | 1/1993 |
| JP | 2004-156589 A | 6/2004 |
| JP | 2005-080439 A | 3/2005 |
| JP | 2007-166858 A | 6/2007 |
| JP | 2009247119 A | 10/2009 |
| JP | 2011-004501 A | 1/2011 |
| KR | 10-2002-0086831 A | 11/2002 |
| KR | 10-2003-0073849 A | 9/2003 |
| KR | 10-2006-0107127 A | 10/2006 |
| WO | WO-2008/060035 A1 | 5/2008 |
| WO | WO-2013/091037 A1 | 6/2013 |
| WO | WO-2013091037 A1 | 6/2013 |

OTHER PUBLICATIONS

International Search Report in International Application No. PCT/KR2014/008858, filed Sep. 23, 2014.

Chinese Office Action dated Dec. 1, 2017 in Chinese Application No. 201480054369.9, with its English translation.

Office Action dated Aug. 16, 2018 in European Application No. 14 850 912.8.

Office Action dated Jul. 26, 2018 in Japanese Application No. 2016-519786.

* cited by examiner

[FIG. 1]
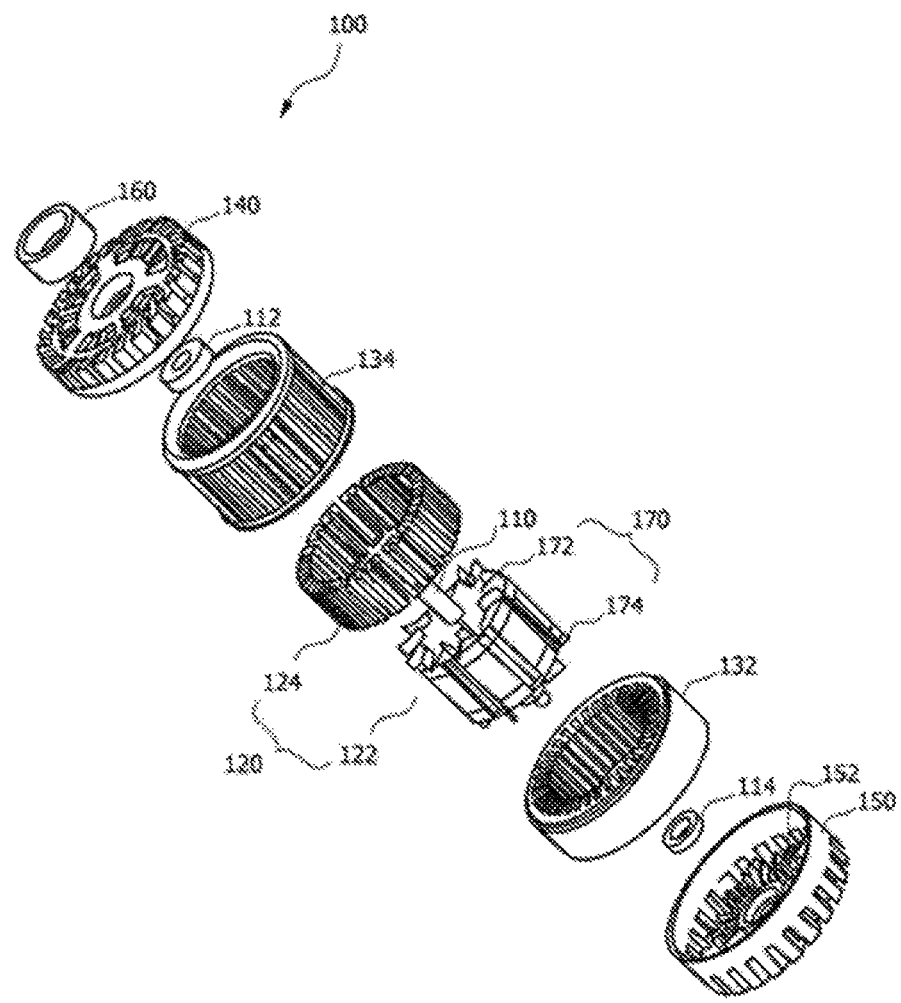

[FIG. 2]
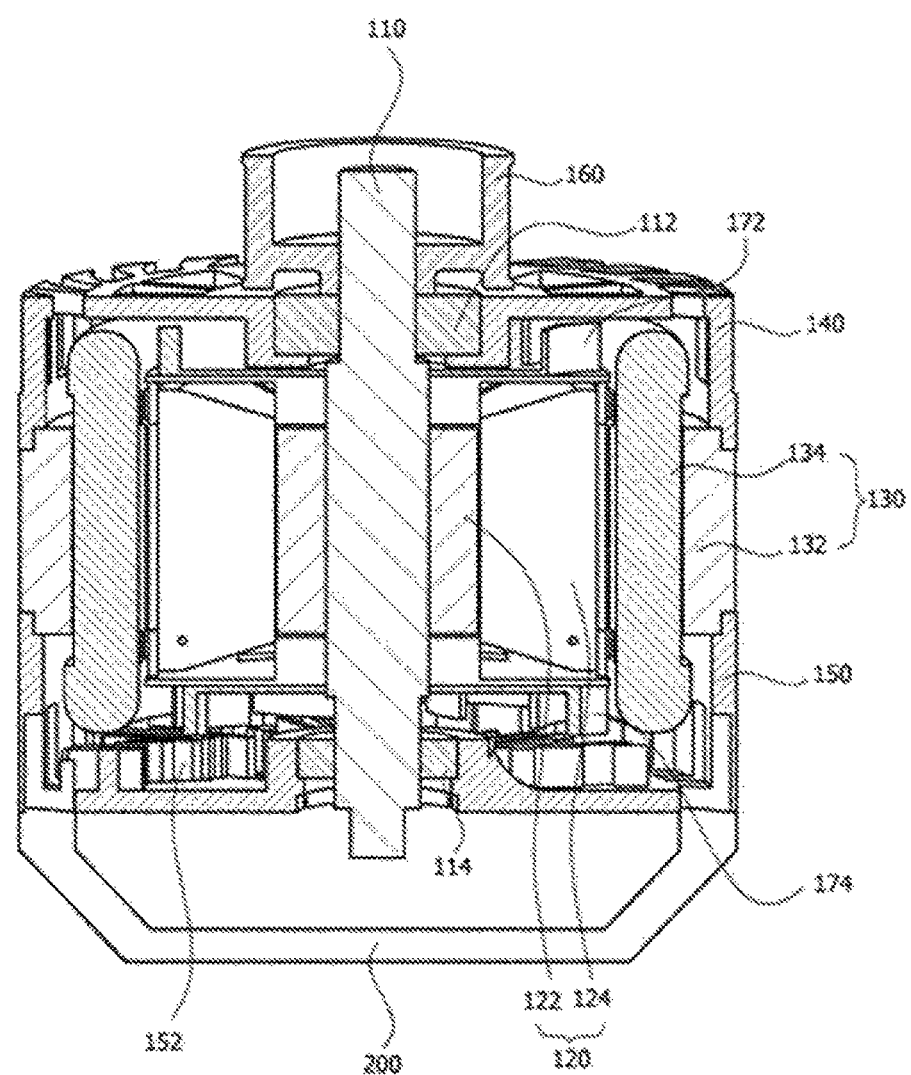

【FIG. 3】
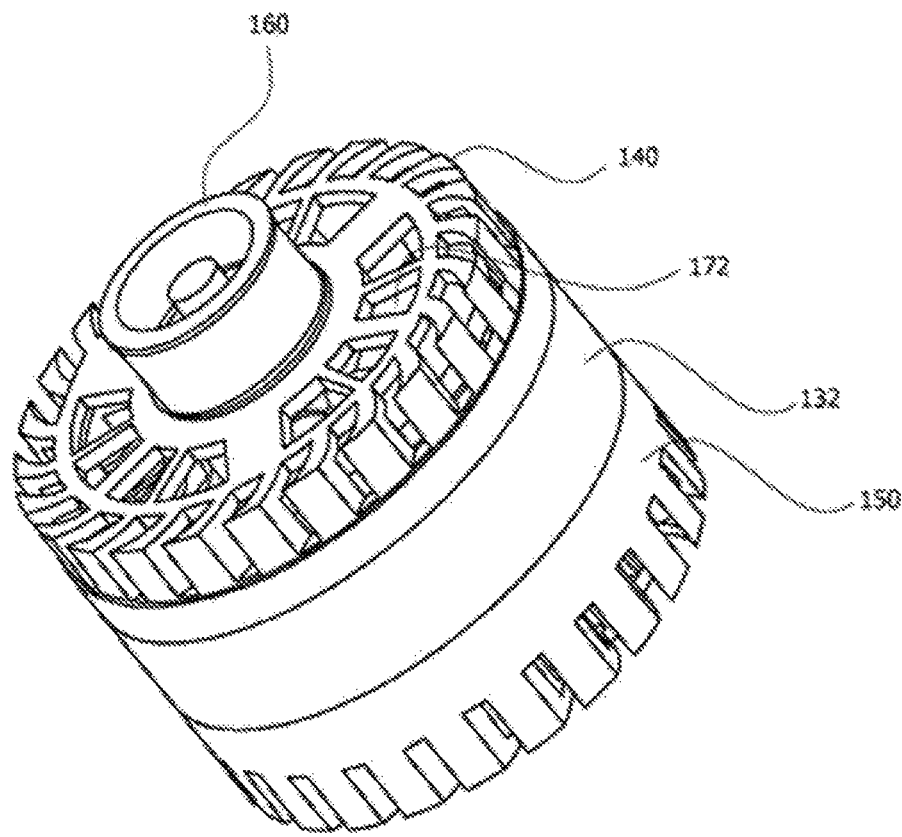
【FIG. 4】
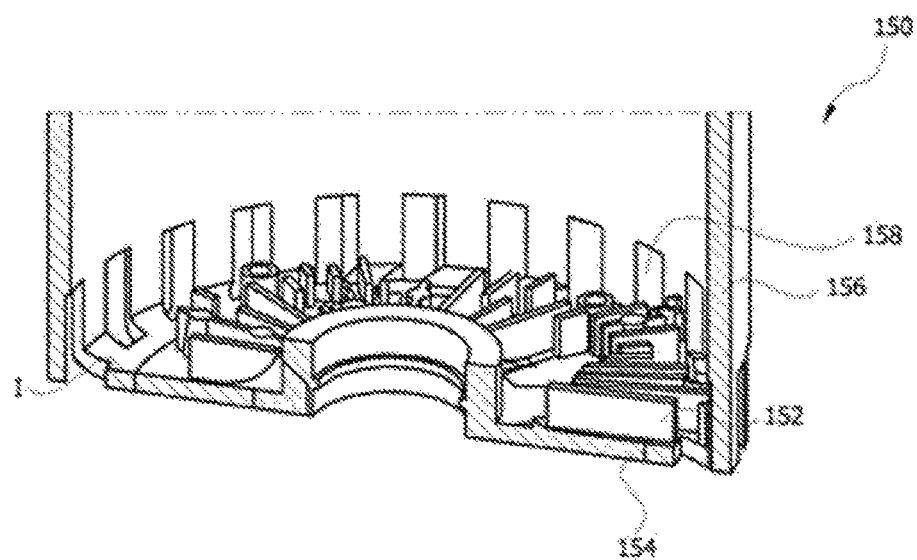

【FIG. 5】
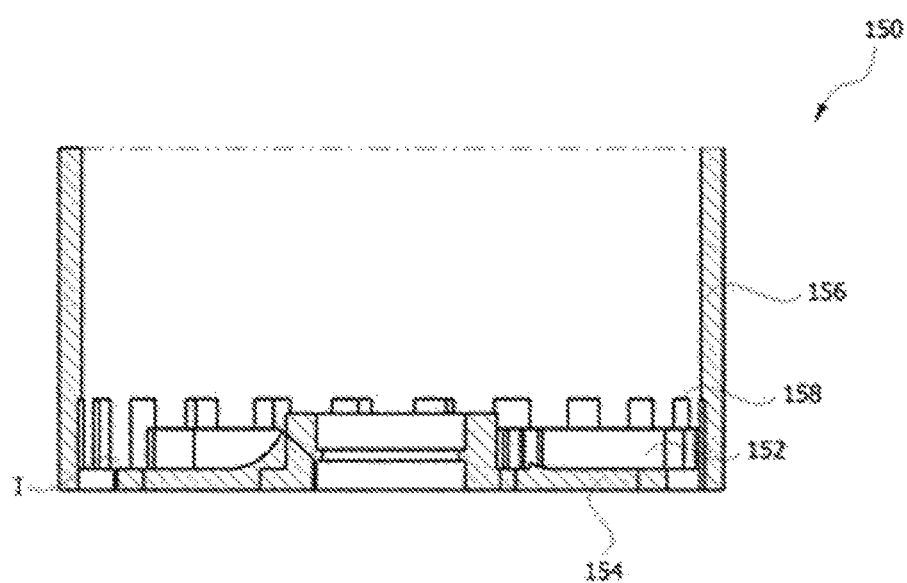

MOTOR

CROSS-REFERENCE TO RELATED APPLICATIONS

This application is the U.S. national stage application of International Patent Application No. PCT/KR2014/008858, filed Sep. 23, 2014, which claims priority to Korean Application No. 10-2013-0118491, filed Oct. 4, 2013, the disclosures of each of which are incorporated herein by reference in their entirety.

TECHNICAL FIELD

The present invention relates to a motor.

BACKGROUND ART

Generally, a motor includes a rotor, a stator, and a housing for accommodating the rotor and the stator. The stator includes a plurality of stator cores and coils wound around each of the stator cores. When current is applied to the coils wound around the stator cores, the rotor rotates due to an electromagnetic interaction with the stator.

A printed circuit board (PCB) including an inverter circuit may be disposed close to the housing of the motor in order to apply current to the stator. Since the PCB including the inverter circuit emits a large amount of heat, the heat needs to be radiated.

Particularly, heat radiation is a major issue in a belt-starter-generator (BSG) motor that simultaneously performs a starter function for driving an engine of a vehicle and an alternator function for generating alternating current using a rotary force of the engine.

For the heat radiation of the motor, a heat sink may be disposed between the housing of the motor and the PCB including the inverter circuit. However, an overall size of the motor increases due to the heat sink.

DISCLOSURE

Technical Problem

The present invention is directed to providing a motor.

Technical Solution

A motor according to one embodiment of the present invention includes a rotation shaft, a rotor part encompassing the rotation shaft, a stator part arranged to be spaced apart from the rotor part, and a housing for fixing the stator part, wherein the inner surface of the housing includes a plurality of projection units.

The plurality of projection units and the inner surface of the housing may be integrally formed.

The plurality of projection units may be plates erected on the inner surface of the housing.

The plurality of projection units may be a heat sink.

The housing may include a first housing arranged on an upper portion of the motor and a second housing arranged on a lower portion of the motor, and the projection units may be formed at an inner surface of a bottom surface of the second housing.

The motor may further include a first heat radiation fan connected to an upper portion of the rotor part and a second heat radiation fan connected to a lower portion of the rotor part.

At least one hole may be formed in at least one of the first housing and the second housing.

The motor may further include a pulley fastened to an upper portion of the rotation shaft for rotating the rotor part using power received from an external part, and a PCB arranged at a lower portion of the second housing and having an inverter circuit mounted thereon.

The plurality of projection units and the housing may include an aluminum material.

The motor may be applied to a BSG.

The housing of the motor according to one embodiment of the present invention includes a bottom surface including the plurality of projection units formed at the inner surface thereof and a wall surface encompassing the circumference of the bottom surface.

The plurality of projection units may be integrally formed with the bottom surface.

At least one of the bottom surface and the wall surface may include a plurality of holes spaced apart at predetermined intervals.

The projection units may be a heat sink.

Advantageous Effects

According to an embodiment of the present invention, a housing and a heat sink may be integrated to miniaturize a motor. Also, a function of the heat sink may be performed in the housing to obtain an excellent heat radiation performance.

In addition, time and cost required for assembling the housing with the heat sink may be reduced.

DESCRIPTION OF DRAWINGS

FIG. 1 is an exploded perspective view of a BSG motor according to one embodiment of the present invention, FIG. 2 is a cross-sectional view of the BSG motor according to one embodiment of the present invention, and FIG. 3 is a perspective view thereof.

FIG. 4 is a cross-sectional view of a lower housing according to one embodiment of the present invention, and FIG. 5 is a perspective view of the lower housing according to one embodiment of the present invention.

MODES OF THE INVENTION

Since various modifications may be applied to the present invention and the present invention may have several embodiments, particular embodiments will be illustrated in the drawings and described. However, the particular embodiments are not for limiting the present invention, and it should be construed that all modifications, equivalents or substitutes included in the spirit and the technical scope of the present invention belong to the present invention.

Terms including ordinals such as first, second, etc. may be used in describing various elements, but the elements are not limited by the terms. The terms are used only for differentiating one element from another element. For example, a second element may be referred to as a first element and likewise, a first element may also be referred to as a second element without departing from the scope of the present invention. The term "and/or" includes a combination of a plurality of related described items or any item among the plurality of related described items.

When it is mentioned that a certain element is "connected to" or "linked to" another element, although the certain element may be directly connected to or linked to the another element, it should be understood that another element may be present therebetween. Conversely, when it is mentioned that a certain element is "directly connected to" or "directly linked to" another element, it should be understood that another element does not exist therebetween.

The terms used in this application are merely used for describing particular embodiments and are not intended to limit the present invention. A singular expression includes a plural expression unless clearly indicated otherwise contextually. In this application, the terms "include" or "have" are for designating that features, numbers, steps, operations, elements, parts described in this specification or combinations thereof exist and should not be construed as excluding a presence or possibility of adding one or more other features, numbers, steps, operations, elements, parts, or combinations thereof in advance.

Unless defined otherwise, all terms used herein including technical or scientific terms have the same meanings as those generally understood by those of ordinary skill in the art to which the present invention pertains. The terms which are the same as those defined in a generally used dictionary should be construed as having meanings that correspond to contextual meanings of the related art, and unless clearly defined in this application, the terms should not be construed as having ideal or extremely formal meanings.

Hereinafter, embodiments will be described in detail with reference to the accompanying drawings while like reference numerals will be given to the same or corresponding elements throughout the drawings and overlapping description thereof will be omitted.

FIG. 1 is an exploded perspective view of a BSG motor according to one embodiment of the present invention, FIG. 2 is a cross-sectional view of the BSG motor according to one embodiment of the present invention, and FIG. 3 is a perspective view thereof.

Referring to FIGS. 1 to 3, a BSG motor 100 includes a rotation shaft 110, a rotor part 120, a stator part 130, an upper housing 140, and a lower housing 150. For convenience of description, with respect to FIG. 1, a side closer to a pulley 160 is defined as an upper portion, and a side farther from the pulley 160 is defined as a lower portion.

The rotation shaft 110 is supported by an upper bearing 112 and a lower bearing 114.

The rotor part 120 encompasses the rotation shaft 110, and the rotor part 120 may move along an axial direction when the rotation shaft 110 rotates. The rotor part 120 may rotate when the rotation shaft 110 moves along the axial direction. The rotor part 120 may also simultaneously rotate with the rotation shaft 110. Meanwhile, although the rotor part 120 is illustrated in FIG. 1 as including a rotor core 122 and a drive magnet 124 mounted on the rotor core 122, embodiments are not limited thereto. When the motor 100 is a wire-wound magnetic field type motor, a coil may be wound around the rotor core 122 instead of being wound around the drive magnet 124, and the rotor part 120 may rotate due to current applied thereto.

The stator part 130 includes a stator core 132 and a coil 134 wound around the stator core 132, and is spaced apart from the rotor part 120 to face the rotor part 120. When current is applied to the coil 134, the rotor part 120 may rotate by an electromagnetic interaction with the stator part 130.

The upper housing 140 and the lower housing 150 fix the stator part 130. For this, the upper housing 140 and the lower housing 150 may be respectively fastened to an upper portion and a lower portion of the stator core 132. Although not illustrated, the upper housing 140 and the lower housing 150 may be directly fastened to shield the rotor part 120 and the stator part 130 from the outside.

The pulley 160 is fastened to an upper portion of the rotation shaft 110 and may be coupled to a belt moving in conjunction with engine power in order to rotate the rotor part 120. Also, the pulley 160 may rotate external parts such as an engine in accordance with the rotation of the rotor part 120. A plurality of grooves may be formed in an outer circumferential surface of the pulley 160 to have a groove belt fastened thereto.

A PCB on which an inverter circuit is mounted (hereinafter, referred to as an inverter part 200) is disposed below the lower housing 150 to electrically connect the external parts (e.g. an engine) and the motor 100. Although it is illustrated in FIG. 2 that the inverter part 200 is directly connected to the lower housing 150 for convenience of description, embodiments are not limited thereto.

When the motor according to an embodiment of the present invention operates as an alternator, the pulley 160 rotates by driving an engine and rotates the rotor part 120 to generate alternating current. The generated alternating current may be converted to direct current by a diode, etc. disposed at the inverter part 200 to be supplied to external parts (e.g. a battery, etc.)

When the motor according to an embodiment of the present invention operates as a starter, the rotor part 120 rotates by current applied through the inverter part 200, and the pulley 160 connected to the rotation shaft 110 may also rotate to drive the external parts (e.g. an engine).

A heat radiation performance is important in the BSG motor. The motor 100 may further include a heat radiation structure to easily discharge heat.

According to an embodiment of the present invention, the motor includes a heat radiation fan 170, and a plurality of projection units are integrally formed with the housing at the inner surface of the housing.

The heat radiation fan 170 is connected to the rotor part 120 and may simultaneously rotate with the rotor part 120. The heat radiation fan 170 may include an upper heat radiation fan 172 connected to an upper portion of the rotor part 120 and a lower heat radiation fan 174 connected to a lower portion of the rotor part 120. A plurality of holes are formed in the upper housing 140 and the lower housing 150, and heat may be discharged to the outside of the motor through the plurality of holes. A plurality of projection units 152 integrally formed with the lower housing 150 at an inner surface of the lower housing 150 may perform a function of a heat sink. Hereinafter, although the projection units that perform the function of a heat sink being formed at the inner surface of the lower housing 150 will be described as an example for convenience of description, embodiments are not limited thereto. The projection units that perform the function of a heat sink may also be formed at an inner surface of the upper housing 140.

FIG. 4 is a perspective view of a lower housing according to one embodiment of the present invention, and FIG. 5 is a cross-sectional view of the lower housing according to one embodiment of the present invention.

Referring to FIGS. 4 and 5, the lower housing 150 includes a bottom surface 154 including the plurality of projection units 152 formed at an inner surface I thereof, and a wall surface 156 encompassing the circumference of the bottom surface 154. The plurality of projection units 152 absorbs heat radiated from the inverter part 200, etc. and radiates the heat to the outside. In this manner, when the projection units 152 that perform the function of a heat sink are arranged at the inner surface of the lower housing 150, a heat sink does not have to be additionally arranged below the lower housing 150, thus a thickness of the motor may be reduced and a miniaturized and lightened motor may be obtained. Also, since the projection units 152 are disposed close to the heat radiation fan 174 and may directly interact with the heat radiation fan 174, a further improved heat radiation performance may be obtained.

Here, the projection units 152 may be integrally formed with the lower housing 150. For this, the projection units 152, the bottom surface 154, and the wall surface 156 may be manufactured by die casting. Here, the projection units 152, the bottom surface 154, and the wall surface 156 may be manufactured using an aluminum material. A composition of aluminum and an additive may vary in accordance with a required heat radiation performance and hardness. When the projection units 152 and the lower housing 150 are integrally formed, an assembly between the projection units 152 and the lower housing 150 is not separately required, thus the amount of assembling work may be reduced.

In addition, the projection units 152 may be in the shape of plates erected on the bottom surface 154. That is, the lengths and the heights of the projection units 152 may be larger than the thicknesses thereof. Accordingly, an area in which the projection units 152 that perform the function of a heat sink come in contact with air increases such that the heat radiation performance may be improved. Here, the heights of the plurality of projection units 152 may be formed different from each other. For example, a short projection unit and a tall projection unit may be alternately arranged. Accordingly, the heat radiation performance of the projection units may be improved.

Although not illustrated, the projection units 152 may also be formed at an inner surface of the wall surface 156. However, the projection units at the wall surface 156 may be formed to not overlap the projections units on the bottom surface.

In addition, a plurality of holes 158 may be spaced apart and formed at predetermined intervals in the bottom surface 154 and the wall surface 156 of the lower housing 150. Here, the heights of the holes 158 formed in the wall surface 156 may be higher than the heights of the projection units 152. Accordingly, heat inside the motor may be easily discharged to the outside of the motor.

Although the BSG motor has been described as an example, embodiments are not limited thereto. The embodiments of the present invention may be applied to a motor requiring a heat radiation performance in various ways.

Although the present invention has been described with reference to preferred embodiments of the present invention, those of ordinary skill in the art will understand that the present invention may be modified and changed in various ways within a range not departing from the spirit and scope of the present invention described in the claims below.

The invention claimed is:

1. A motor comprising: a rotation shaft; a rotor part encompassing the rotation shaft; a stator part arranged to be spaced apart from the rotor part; and a housing configured to fix the stator part;
   circuit board having an inverter circuit mounted thereon;
   wherein the housing comprises a first housing arranged on one side of the stator part and a second housing arranged on an opposite side of the stator part, wherein the printed circuit board is arranged outside a bottom surface of the second housing,
   wherein a plurality of first projection units is formed at an inner surface of the bottom surface of the second housing, and wherein a plurality of first holes is formed on the bottom surface and a lateral surface of the second housing;
   further comprising a plurality of second projection units formed at an inner surface of lateral surface of the second housing, wherein the plurality of second projection units formed at the lateral surface is formed not to overlap the plurality of first projection units formed at the bottom surface.

2. The motor according to claim 1, wherein lengths and heights of the first projection units are greater than thicknesses of the first projection units, and the first projection units having different heights are alternately arranged at the inner surface of the second housing.

3. The motor according to claim 1, wherein the plurality of first projection units and the second housing are formed of an aluminum material, and are integrally formed by die casting.

4. The motor according to claim 1, wherein the plurality of first projection units is arranged not to be between the second housing and the printed circuit board.

5. The motor according to claim 1, further comprising a first heat radiation fan connected to one side of the rotor part and a second heat radiation fan connected to an opposite side of the rotor part,
   wherein the first heat radiation fan and the second heat radiation fan simultaneously rotate with the rotor part.

6. The motor according to claim 1, wherein at least one second hole is formed on the first housing.

7. The motor according to claim 1, further comprising a pulley fastened to one side of the rotation shaft to rotate the rotor part by power received from an external part.

8. The motor according to claim 1, wherein the motor is coupled to a belt-starter-generator.

* * * * *